UNITED STATES PATENT OFFICE.

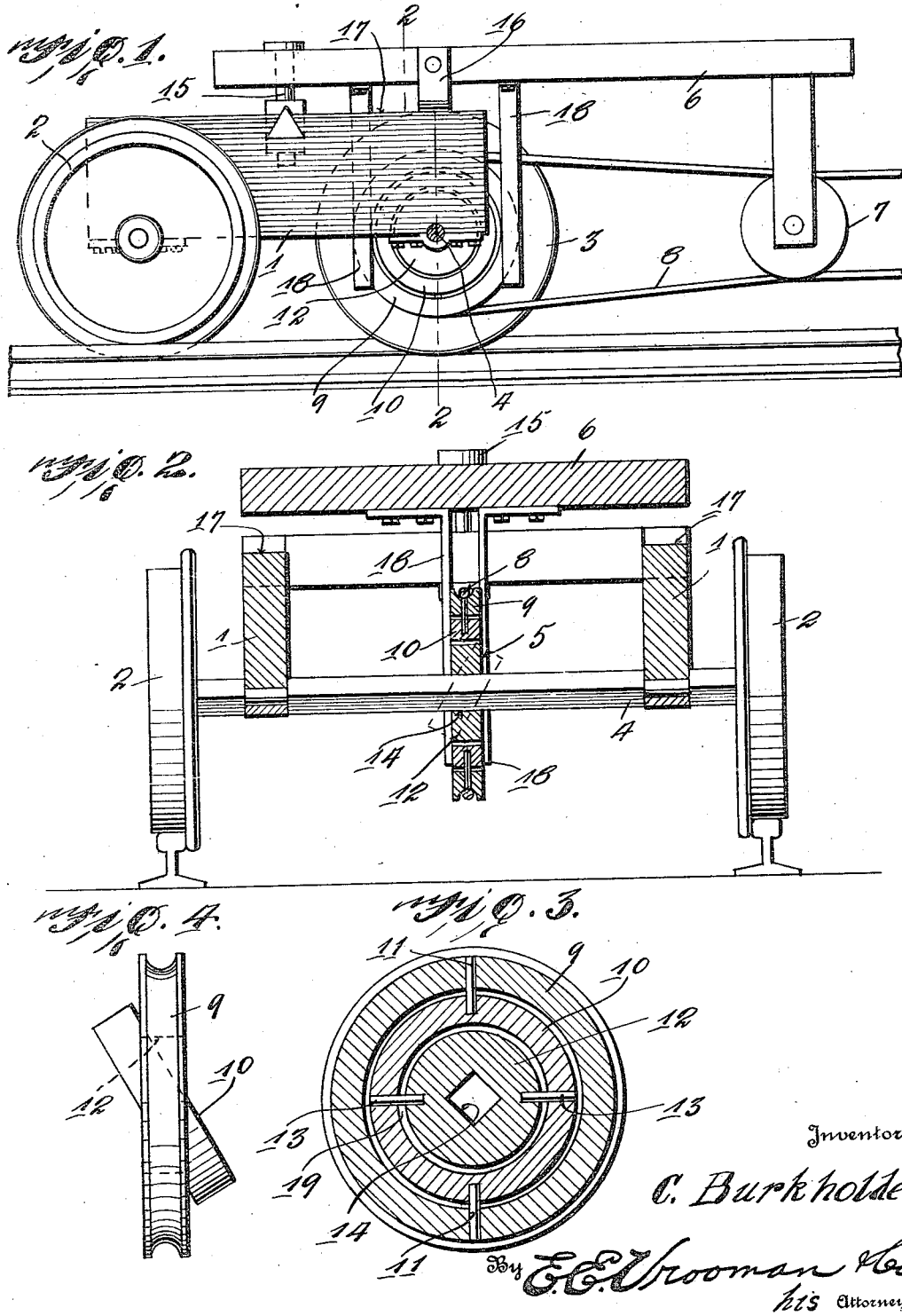

CLYDE BURKHOLDER, OF RUTH, NEVADA.

FLEXIBLE SHEAVE.

1,267,374.　　　　　Specification of Letters Patent.　　Patented May 28, 1918.

Application filed November 20, 1917. Serial No. 203,054.

*To all whom it may concern:*

Be it known that I, CLYDE BURKHOLDER, a citizen of the United States of America, residing at Ruth, in the county of White Pine and State of Nevada, have invented certain new and useful Improvements in Flexible Sheaves, of which the following is a specification, reference being had therein to the accompanying drawing.

This invention relates to a flexible sheave which is especially adapted for use upon track vehicles such as a steam shovel, ditchers and the like.

Another object of this invention is the production of a simple, and efficient sheave which will prevent the driving chain or belt from coming off when the machine is moved in a circle or around a curve.

With these and other objects in view this invention consists of certain novel constructions, combinations and arrangements of parts as will be hereinafter fully described and claimed.

In the drawings:

Figure 1 is a side elevation of the sheave applied to a truck.

Fig. 2 is a section on line 2—2 of Fig. 1.

Fig. 3 is a vertical section through the sheave.

Fig. 4 is an edge elevation of the sheave.

When using the sheave now commonly employed the driver stays in line with the body of the machine while the driven sheave stays in line with the axle or truck, in this manner throwing the driven sprocket chain or belt out of line according to the degree of the curve upon which the machine is traveling.

By referring to the drawings it will be seen that 1 designates the truck of the sheave carrying vehicle, the truck 1 being supported upon the rear wheels 2 and the forward wheels 3. The wheels 3 support a front axle 4 and the flexible sheave 5 is mounted upon this front axle 4.

A suitable table 6 is supported in any desired or convenient manner upon the truck 1 and a driven pulley 7 is suspended from the forward end of the table 6. A driving belt or chain 8 passes around this pulley 7 and this driving belt or chain 8 also passes around the outer rings 9 of the flexible sheave 5. An intermediate ring 10 is pivotally mounted within the outer ring 9 upon the pins or studs 11, these pins or studs 11 properly extending in vertical alinement with respect to each other. An inner ring 12 is in turn pivotally mounted within the ring 10 by means of the pivot pins or studs 13, these pivot pins or studs 13 extending in horizontal alinement with respect to each other. The inner ring 12 is provided with a square aperture 14 formed therein through which the square axle 4 passes thereby locking the sheave 5 upon the axle 4.

The table 6 is mounted upon the truck 1 by means of the king bolt 15. A depending bracket 16 is secured to the table 6 and extends thereunder and rests upon the upper face 17 of the truck 1 and at the same time permits the table 6 to swing freely upon the truck 1. This bracket 16 merely bearing upon or resting upon the upper edge of the truck 1.

Fingers 18 are secured to the under face of the table 6 and these fingers 18 are arranged in pairs for fitting upon each side of the outer ring 9 for causing the outer ring to at all times keep in alinement with the table 6 irrespective of the position of the truck 1. This is possible for the reason that the intermediate ring 10 is pivotally secured to the outer ring 9 upon the pins 11. The inner ring 12 is of course held against swinging movement upon the axle 4 but since the intermediate ring 10 is pivotally mounted upon the pins 13 carried by the inner ring 12, it will be seen that these rings and their mounting will produce a structure having a universal movement. Suitable spacing washers 19 are interposed between the rings of the sheave 5 upon the pins 11 and 13 for holding these rings in proper space relation.

It should, of course, be understood, that the sheave 5 is intended to rotate and that the pins 11 and 13 extend at right angles to each other thereby permitting the intermediate and outer rings to swing at right angles to each other. By having the structure produced as illustrated and described, it will be seen that the driving belt or chain will not be likely to jump off of the sheave 5 due to the face that the driving pulley 7 and the outer ring 9 will at all times be held in proper alinement with respect to each other.

What I claim is:

1. The combination with a truck, a table pivotally mounted thereon, an axle, a flexible sheave carried by said axle, and means carried by said table and engaging said sheave for keeping the driven portion of said sheave in proper alinement with respect to said table.

2. The combination with a truck, an axle, a flexible sheave carried by said axle, a table pivotally mounted upon said truck, a driving sheave carried by said table, said flexible sheave provided with a driven portion, means passing from said driving sheave and from the driving portion of said driven sheave, and means engaging the driving portion of said driven sheave for holding the same in alinement with said driving sheave.

3. The combination with a truck, an axle square in cross-section, a flexible sheave having a squared aperture and carried by said axle, a table pivotally mounted upon said truck, a driving sheave carried by said table, said flexible sheave provided with a driven portion, means passing from said driving sheave and from the driving portion of said driven sheave, a pair of parallel guide fingers carried by said table and engaging the driving portion of said driven sheave for holding the driving portion of said driven sheave in alinement with said driving sheave.

4. In an apparatus of the class described, the combination with an axle, a flexible sheave carried by said axle, of a frame mounted on said axle, a table positioned above said frame, a bolt extending through said table near one end thereof and connecting the same to said frame, a bracket secured to said table and bearing upon said frame, said table provided near its front end with a bracket carrying a pulley, a belt passing over said pulley and over said sheave, a plurality of pairs of fingers secured to the under face of said table, each pair of fingers arranged in parallelism and the fingers in each pair positioned upon opposite sides of said sheave, said sheave comprising a plurality of pivoted sections, and said fingers engaging the outer section of said sheave for holding said outer section in alinement with said pulley, substantially as shown and described.

In testimony whereof I hereunto affix my signature.

CLYDE BURKHOLDER.

Copies of this patent may be obtained for five cents each, by addressing the "Commissioner of Patents, Washington, D. C."